United States Patent Office 2,852,475
Patented Sept. 16, 1958

2,852,475

POLYALKYLENE GLYCOL MODIFIED ALKYD RESIN - AMINOTRIAZINE - ALDEHYDE RESIN AND SYNTHETIC POLYMERIC LATEX

Roger M. Christenson, Whitefish Bay, and Lowell O. Cummings and Donald P. Hart, Milwaukee, Wis., assignors to Pittsburgh Plate Glass Company No Drawing. Application August 17, 1954
Serial No. 450,543

14 Claims. (Cl. 260—21)

This invention relates to water dispersed coating compositions capable of forming hard, glossy, flexible films, and pertains more particularly to water dispersed baking enamels formed essentially from resinous components including a water dispersible alkyd resin, a triazine-aldehyde resin, and a synthetic polymeric latex.

In recent years there has been an ever increasing trend toward the use of aqueous vehicles in coating compositions. The remarkable growth in the use of these water based materials has been due primarily to several factors: (a) the substitution of water for organic solvents greatly reduces the cost of the coating material and eliminates the need for costly solvent recovery equipment, (b) the use of water as a vehicle eliminates the flammability hazard which the highly volatile solvents present, and (c) the sometimes disagreeable odors of the solvents utilized are eliminated.

Heretofore, however, it has not been possible to produce a useful baking enamel having an aqueous vehicle. Previous attempts to produce such a material resulted in discontinuous films, poor adhesion, poor flexibility, lack of film strength and other serious disadvantages. Consequently, the use of aqueous vehicles in coating compositions has been limited to air drying compositions such as are utilized on the interior surfaces of homes, offices, and factory buildings. Such compositions ordinarily contain as the sole resinous component a butadiene-styrene polymer latex.

It has now been discovered that useful water dispersed coating compositions can be formed by utilizing as resinous components thereof, a water dispersible alkyd resin, a triazine-aldehyde resin, and a synthetic polymeric latex. The resulting compositions form films which are hard, glossy and flexible, and which possess excellent mar and water resistance. These coating compositions can be applied by brushing, spraying or dipping, and dry readily when baked at temperatures of about 250° F. to 350° F. for periods of about 30 minutes.

It is quite surprising that clear, glossy films are obtained from a composition containing two highly polar materials such as a triazine-aldehyde resin and a water-dispersible alkyd resin, in combination with a non-polar synthetic polymeric latex. Synthetic polymeric latices such as polystyrene latices do not ordinarily deposit continuous films when applied as aqueous emulsions to surfaces such as metal, wood, and the like, even when utilized in combination with various other resinous materials. For example, films obtained from a blend of polystyrene and certain water dispersible alkyd resins tend to be soft, of poor quality and of little or no utility.

The component ordinarily, though not necessarily, utilized in a predominant amount in preparing the coating compositions of this invention is a water dispersible alkyd resin, in which water dispersibility is obtained by incorporating therein a polyalkylene glycol, and preferably a polyethylene glycol of the type known commercially as the "Carbowaxes." Alkyd resins of this type, as well as methods for their preparation, are disclosed in U. S. Patent No. 2,634,245. The method of the patent involves first preparing a conventional alkyd resin, such resins being readily obtainable as commercial products. Useful alkyd resins can be prepared, for example, by heating an acid or anhydride such as phthalic anhydride with glycerol, together with a drying oil derivative modified by ester interchange with glycerol in order to form the monoglycerides or diglycerides of fatty acids. In some instances, "oil modification" is effected by first reacting the free fatty acids of a glyceride oil, ordinarily a drying oil, with glycerol to form mono- or diglycerides or mixtures thereof. These partial esters may then be incoporated with phthalic acid and glycerol (if required) and the mixture can be heated to form a polyester. The oil modified resins can also be obtained by incorporation of the fatty acids and glycerine with phthalic acid and heating the mixture to reaction temperature. Normally, the polyesters will contain 30 percent to 70 percent and preferably 45 percent to 70 percent by weight or slightly more or less of the glyceride oil or its equivaent of mono- or diglyceride. Such resins are ordinarily spoken of as being 30 percent to 70 percent or 45 percent to 70 percent oil modified. The total glycerol component of the mixture normally should be in approximate molecular equvalency of the carboxyls of the acid or anhydride and the fatty acids of the drying oil. In some instances glycerol may be partially or completely replaced by pentaerythritol or similar materials.

Preferably, the alkyd resin components are heated until water is evolved by condensation reaction and is separated from the reaction zone. The reaction is continued until fairly high viscosities are obtained; for example, a Gardner-Holdt viscosity of about W to Z should be obtained when a sample of the resin is diluted with 50 percent by weight of naphtha. In any event, heating should not be continued so long as to form an insoluble, infusible product.

The polyalkylene glycol component which is employed as a modifier of the alkyd resin base to obtain water dispersibility properties preferably is a condensation product of ethylene glycol of relatively high average molecular weight and usually includes a plurality of ether linkages. The average molecular weight will ordinarily be above 300 and may be as high as 1500 or 2000. Best results have been obtained by the use of polyethylene glycols having molecular weights within a range of 300 to about 1500, although it is to be understood that mixtures of polyethylene glycols having molecular weights as high as 2000 or as low as 200 may also be utilized. In addition to polyethylene glycols, other polyalkylene glycols such as polypropylene glycol and the like, may also be utilized.

The proportion of the alkyd resin base and the polyalkylene glycol utilized in preparing water dispersible alkyd resins can be varied widely. Good results are obtained when the polyalkylene glycol is utilized in an amount of about 15 percent to 25 percent by weight of the combination of alkyd resin and polyalkylene glycol. Higher and lower proportions, for example as low as 10 percent by weight or lower to as high as 30 percent by weight or higher can be used successfully. In preparing the water dispersible polyalkylene glycol modified alkyds, it is desirable that the alkyd resin be preliminarily heated to a temperature which usually will be about 200° C., and in most instances below 300° C. Good results have been obtained by preliminarily heating the mixture to 220° C. or 235° C. The polyalkylene glycol is also preferably heated to a temperature within the foregoing range and is then added to the preheated alkyd resin base. The mixture should be maintained at the foregoing temperature until the polyalkylene glycol goes into solution. It is believed that esterification between residual free carboxyls and the hydroxyls of the polyalkylene glycol occurs. As the heating operation is continued, it will be found that in many cases the viscosity of the solution will tend to fall. Heating should be continued until the minimum viscosity, as determined on small samples of the reaction product, is reached and the viscosity begins to rise. Obviously, heating should be discontinued before the tendency of the mixture to gel becomes pronounced. The attainment of a satisfactory degree of reaction between the alkyd resin and the polyalkylene glycol may be determined by conducting tests of the dispersibility of the alkyd resins in water upon small samples drawn off from time to time from the reaction mixture. The reaction product, if properly made, should be readily dispersible by mere agitation in hard or soft water without the addition of dispersing agents such as casein or soaps, although it is sometimes desirable to add a small quantity of a lower alkanol such as ethanol or the like to aid in dispersing the alkyd resin. The resulting emulsion should be of the oil-in-water type, that is, the water should constitute the continuous phase.

A second component utilized in preparing the coating compositions of this invention is a water-soluble resin obtained by the condensation of an aldehyde, particularly formaldehyde, with a triazine possessing the basic structure

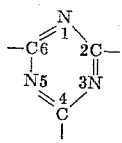

wherein at least one of the free valencies is substituted by an amine group. The preferred triazine-aldehyde resin is one prepared by the condensation of melamine with formaldehyde. Melamine is the simplest triazine and possesses the structure

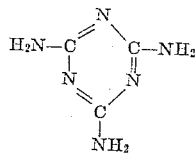

Water soluble melamine-formaldehyde resins are readily obtained, for example, by the method of U. S. Patent 2,529,856, which involves reacting a lower alkanol with a polymethylol melamine in the presence of an acid for such length of time as is necessary to obtain a clear solution and also for such length of time as is necessary to obtain reaction of the alkanol with the polymethylol melamine, then neutralizing said solution or making it slightly alkaline, and concentrating it by distillation under high vacuum until the concentration of resin solids is at least about 80 percent. If a solid dry resin is desired the distillation is continued until a substantially anhydrous, viscous syrup is obtained. This syrup, upon cooling, forms a clear, water-white, resinous solid which is infinitely miscible with water, particularly at room temperature.

A similarly useful water soluble melamine-formaldehyde resin can also be obtained by heating a mixture of formaldehyde and melamine to a temperature of about 160° F., and adding to said mixture a solution of an acidic catalyst such as oxalic acid in methanol or other lower alcohol. The resulting reaction product is then distilled at reduced pressure to a solids content of about 75 percent. This product is readily soluble in water.

In addition to melamine, other amino triazines or their derivatives, for example, 2-chloro-4,6-diamino-1,3,5-triazine, 2-phenyl-4-amino-6-hydroxy-1,3,5-triazine, 6-methyl-2,4-diamino-1,3,5-triazine, and the like may also be utilized to prepare water soluble triazinealdehyde resins for use in preparing water dispersed coating compositions.

The third resinous component of the water dispersed coating compositions prepared according to the method of this invention is a synthetic polymeric latex. Polystyrene latex containing about 50 percent solids is preferred since the films obtained when polystyrene latices are utilized tend generally to be superior to those obtained when other synthetic polymeric latices are employed. However, good films are also obtained when other latices such as polyvinylchloride, polyvinylidene chloride, polyvinylacetate, butadiene-styrene or polyacrylate latices are used. All of these synthetic polymeric latices are commercially available materials.

The respective quantities of alkyd resin, triazine-aldehyde resin, and synthetic polymeric latex employed may be varied substantially without greatly affecting the film forming properties of the coating composition. However, in general it is desired that the alkyd be present in an amount of about 15 percent to 85 percent, the triazine-aldehyde resin in an amount of about 5 percent to 50 percent, and the synthetic polymeric latex in an amount of about 5 percent to 75 percent, these percentages being based upon the total non-volatile weight of the three resinous components. Best results are obtained when the alkyd resin is present in an amount of about 40 to 65 percent, the triazine-aldehyde resin in an amount of about 10 to 20 percent, and the synthetic polymeric latex in an amount of about 20 to 45 percent.

The resinous components described hereinabove can be brought together in a number of different ways to obtain useful water dispersed coating compositions. One preferred method involves first dissolving the triazine-aldehyde resin in water and adding it to the water dispersible alkyd resin. The water used can be either tap or distilled water. After the resulting mixture is stirred to homogeneity it is neutralized with a basic material, such as ammonia, diethylamine, dipropylamine, morpholine, tertiary butylamine, ethanolamine, diethanolamine, triethanolamine, or the like (the volatile amines being preferred) and the pH is adjusted to about 8.0 to 10.0. It is sometimes desirable at this point to add a small quantity of ethanol or other lower alkanol to the mixture to give a clear solution. In the final step the synthetic polymeric latex and color pigment, as well as fillers and other materials, if any, are added and the mixture is stirred for about 5 to 10 minutes to assure good dispersion. The coating composition thus prepared is ready for use without further modification.

Materials which may be added to modify the coating compositions to obtain desired properties includes thickening agents such as casein, carboxymethyl cellulose, natural gums and the like; driers such as cobalt naphthenate or lead naphthenate; catalysts to assist curing of the triazine-aldehyde resin, for example, the morpholine salt of paratoluene-sulfonic acid and the like; and surface active agents such as an alkyl phenol-polyethylene oxide condensate, which serve to modify the surface tension of the coating composition. As will be seen from the specific examples, color pigments can also be added; it is preferred that the pigment be one which does not substantially affect the pH of the coating composition. If desired, other resinous materials such as phenol-aldehyde resins, natural occurring resins, and the like may be added, preferably in minor quantities.

While the above described method of formulating the coating composition is preferred, other orders of addition of the resinous components may also be used with good results. Modifying agents other than those listed above may also be employed.

As indicated hereinabove, it is preferred for reasons of stability that the coating composition have a pH within the range of about 8.0 to about 10.0. It has been found that the pH tends to drop slowly on standing, this probably being due to the fact that some bacterial growth takes place in the aqueous medium. Some of the bacteria tend to be acid forming, and therefore obviously lower the pH of the composition. It is accordingly desirable to include in the coating composition a bactericide; materials which can be used for this purpose include the sodium salts of o-phenylphenol, pentachlorophenol, dichlorophenol, butenylphenols, pine oils, or the like. Only very small amounts of the bactericide are necessary, for example, about 0.25 percent to 1.0 percent based upon the total weight of the coating composition being sufficient ordinarily, although larger quantities may be utilized if desired.

The following examples illustrate in detail the preparation of a water dispersible polyalkylene glycol modified alkyd resin, a water soluble melamine-formaldehyde resin, and the use of such resins in the preparation of water dispersed coating compositions, and specifically water based baking enamels. The examples are not intended to limit the invention, however, for there are, of course, numerous possible variations and modifications.

*Example I*

Fifteen and six-tenths pounds of linseed oil and 3.9 pounds of glycerine were placed in a reactor and covered with a blanket of inert gas. The mixture was heated to a temperature of 375° F. and 4.1 grams of litharge added. The temperature was then raised to 445° F. and held until the alcoholysis was complete (approximately one hour). To the reaction product were added 11.3 pounds of phthalic anhydride, 1.35 pounds of glycerine and 2.0 pounds of xylene. The resulting mixture was then refluxed at 425° F. until an acid number of 20 was obtained. Seven and seven-tenths pounds of a polyethylene glycol having a molecular weight of about 600 was then added and the reaction mixture heated to 428° F. until an acid number below 15 was obtained (approximately 3 hours). The resulting product was a water dispersible alkyd resin obtained in a yield of 95.7 percent. The resin had an acid value of 14.1, a Gardner-Holdt color of 10, a weight per gallon of 9.26 pounds, a total solids of 98.3 percent and a Gardner-Holdt viscosity of 5 minutes.

*Example II*

Thirteen and one-tenth pounds of 37 percent formalin solution (adjusted to a pH of 7.5) and 6.8 pounds of melamine were heated to a temperature of 160° F. When the resulting solution was clear 15.6 grams of oxalic acid and 32.4 pounds of methanol were added through a sparger line, and the resulting mixture refluxed for 15 minutes at a temperature of 160° F. to 165° F. The reaction mixture was then cooled to 120° F. and the pH adjusted to 9.0. The resulting material was filtered and the methanol stripped off under vacuum at temperatures below 50° C. until a total solids of 75 percent was obtained. The final material had the following analysis:

pH _____ 8.5
Percent total solids _____ 67.7
Gardner-Holdt viscosity _____ D
Gardner-Holdt color _____ 1–2

*Example III*

A solution was formed by dissolving 67 grams of a melamine-formaldehyde resin (prepared according to the method of Example III) in 293 grams of water. To the solution were added 225 grams of a polyethylene glycol modified alkyd prepared according to the method of Example II, sufficient diethylamine to adjust the pH of the mixture to 8.0, and 52.5 grams of ethyl alcohol. The resulting mixture was then divided into four parts of 150 grams each. For convenience, the four parts will be designated as A, B, C and D. These were utilized as follows:

(1) To Sample A, 45 grams of a polystyrene latex and 9 grams of a water dispersed carbon black pigment (Aquablak G) were added and the pH was adjusted to 9.4 by the addition of diethylamine.

(2) To Sample B were added 90 grams of a polystyrene latex and 11.2 grams of carbon black pigment. The pH was adjusted to 9.5 by the addition of diethylamine.

(3) To Sample C, 70 grams of a polyvinyl chloride latex and 10.25 grams of carbon black pigment were added and the pH adjusted to 8.6 by the addition of diethylamine.

(4) To Sample D, 70 grams of a butadiene-styrene latex and 10.25 grams of carbon black pigment were added and the pH adjusted to 9.8 by the addition of diethylamine.

Each of the above black enamels was then sprayed onto a steel panel and baked at 350° F. for 30 minutes. The gloss of each film was excellent. Films prepared from Samples A and B were hard and flexible, while the films prepared from Samples C and D tended to be slightly softer, but nevertheless were satisfactory for most uses.

The remaining quantities of Samples A, B, C and D were stored for 7 days and additional panels sprayed with the stored materials. In each instance the gloss was excellent and the other film properties good, with the films prepared from Samples A and B being exceptionally tough.

*Example IV*

Water dispersed black baking enamels were prepared according to the following two formulations:

(1)

| Components: | Weight in grams |
|---|---|
| Melamine-formaldehyde resin (prepared according to method of Example III) | 320 |
| Water | 1121 |
| Polyethylene glycol modified alkyd (prepared according to method of Example II) | 900 |
| Ethanol | 210 |
| Morpholine | 90 |
| Polystyrene latex | 720 |
| Carbon black pigment | 152 |
| Bactericide (17% water solution of sodium salts of 2 parts pentachlorophenol and 1 part o-chlorophenol) | 48 |

(2)

| Components: | Weight in grams |
|---|---|
| Melamine-formaldehyde resin (prepared according to method of Example III) | 320 |
| Water | 1121 |
| Polyethylene glycol modified alkyd (prepared according to method of Example II) | 900 |
| Ethanol | 210 |
| Morpholine | 80 |
| Polystyrene latex | 1440 |
| Bactericide (17% water solution of sodium salts of 2 parts pentachlorophenol and 1 part o-chlorophenol) | 59 |
| Carbon black pigment | 170 |

Each formulation was prepared by first dissolving the melamine-formaldehyde resin in water and adding the resulting solution to the polyethylene glycol modified alkyd. After the mixture was stirred to homogeneity, it was neutralized with morpholine and the pH adjusted to about 9.5. The ethanol was then stirred into the mixture to give a clear solution, after which the polystyrene latex and the black pigment were added and the composition stirred for 5 to 10 minutes to insure a good dispersion.

Films of each coating composition were drawn down on tinplate and baked for 25 to 30 minutes at 350° F. The gloss was excellent for both films as was the resistance to water. The Sward hardness for formulation 1 was 14 and the impact resistance 20 inch pounds, and for formulation 2, the Sward hardness was 20 and the impact resistance 20 inch pounds. This example demonstrates that the film hardness is increased as the quantity of polystyrene latex utilized is increased.

In addition to black pigments, other pigments can be used to obtain any desired color.

*Example V*

Two water dispersed baking enamels were prepared and the film properties thereof determined. The method of preparation was that of the previous examples and the three resinous components were present in the following amounts:

(1)

| | Percent by weight |
|---|---|
| Melamine-formaldehyde resin | 17.3 |
| Polystyrene latex | 23.7 |
| Polyethylene glycol modified alkyd resin | 59.0 |

(2)

| | Percent by weight |
|---|---|
| Melamine-formaldehyde resin | 14 |
| Polystyrene latex | 38 |
| Polyethylene glycol modified alkyd resin | 48 |

The compositions were sprayed onto steel plates and baked at 300° F. for 30 minutes. The following are the film properties:

| Film Properties | 1 | 2 |
|---|---|---|
| Sward hardness | 14–18 | 16–20. |
| Impact (inch-pounds) | 48 | 48. |
| Flexibility | 48 | 48. |
| Gloss (Gardner Glossmeter) | Excellent | Excellent. |
| Water resistance (24 hours at 25° C.) | >90 | >90. |
| | Good | Good. |

*Example VI*

A water dispersible iron oxide sanding type primer was prepared using a basic vehicle system comprising 31 percent of a butadiene-styrene latex, 16 percent of a water soluble melamine-formaldehyde resin, and 52 percent of a polyethylene glycol modified linseed oil alkyd resin. The composition contained standard iron oxide primer pigments dispersed with ammonium oleate and potassium tripolyphosphate, the latter compound also serving as a sequestering agent and rust inhibitor. Tributylphosphate and pine oils were added as a foaming agent, and a mixture of the sodium salts of orthophenylphenol and pentachlorophenol were added as bactericides. Manganese naphthenate was added as a drier and ethanol was added to aid in the solvation of the alkyd resin and to disperse the manganese naphthenate in the alkyd resin. To maintain the coating composition at a pH of about 9.0 to 10.0 ammonium hydroxide was employed.

The resulting compositions sprayed well at a viscosity of 20 seconds in a #4 Ford cup. The film was baked at 300° F. to give dry film thicknesses up to 1.5 mils without blistering. Heavier films could be obtained by flashing for 3 minutes at 200° F., followed by a curing bake. The films had very good sanding properties and gave good gloss, hold out, and water resistance comparable to that of standard primers of this type. The primer to metal and primer to top coat adhesion was excellent.

The water dispersed coating compositions obtained by the methods described hereinabove are particularly useful for application by spraying, brushing, dipping or flow coating to metal surfaces because of their excellent adhesion to such surfaces and their outstanding impact resistance. Accordingly, they can be used effectively as finishes for toys, appliances and similar objects. The coating compositions can also be applied to other materials which can withstand the 250° F. to 350° F. temperatures required to obtain a dry, hard, glossy film in a period of about 30 minutes. Some of the compositions, particularly those rich in polystyrene, have also been found to dry in air and as such can be utilized to coat wood, paper or textile fabrics.

While the compositions described in the specific examples contain color-imparting pigments, such pigments can be omitted, the resulting products depositing clear, or in some instances slightly hazy films, which are hard, flexible and which possess excellent adhesion, mar resistance and impact resistance. These clear, or substantially clear coating compositions are useful as "shop coats," that is, as protective coatings for parts and materials awaiting fabrication, or for similar applications.

From the foregoing description, it will be apparent that the coating compositions of the present invention constitute a new and useful group of materials. It will also be apparent to those skilled in the art that numerous variations and modifications can be made in the compositions described herein without departing from the spirit and scope of the invention as defined in the appended claims.

We claim:

1. A water-dispersed coating composition comprising from 15 percent to 85 percent by weight of a heat reaction product of a polyalkylene glycol having a molecular weight of at least 200 and an alkyd esterification product of a polycarboxylic acid, a polyhydric alcohol containing at least three hydroxy groups and fatty acids of a drying oil, said heat reaction product containing from 10 to 30 percent by weight of said polyalkylene glycol based on the weight of said alkyd esterification product, from 5 percent to 50 percent by weight of a water-soluble amino-triazine-aldehyde resin, and from 5 percent to 75 percent by weight, based on the polymeric solids content, of a synthetic polymeric latex selected from the group consisting of polystyrene latex, polyvinyl chloride latex, polyvinylidene chloride latex, polyvinylacetate latex and a butadiene-styrene copolymer latex.

2. A water-dispersed coating composition capable of forming continuous, hard, flexible, glossy films when baked for about 30 minutes at a temperature of 250° F. to 350° F., the resinous components of which comprise from 15 percent to 85 percent of a heat reaction product of a polyalkylene glycol having a molecular weight of at least 200 and an alkyd esterification product of a polycarboxylic acid, a polyhydric alcohol containing at least three hydroxy groups and fatty acids of a drying oil, said heat reaction product containing from 10 to 30 percent by weight of said polyalkylene glycol based on the weight of said alkyd esterification product, from 5 percent to 50 percent by weight of a water-soluble amino-triazine-aldehyde resin, and from 5 percent to 75 percent by weight, based on the polymeric solids content, of a synthetic polymeric latex selected from the group consisting of polystyrene latex, polyvinyl chloride latex, polyvinylidene latex, polyvinylacetate latex and a butadiene-styrene copolymer latex, said coating composition being maintained at a pH of about 8.0 to 10.0.

3. A method of preparing a water-dispersed coating composition which comprises adding an aqueous solution of from 5 percent to 50 percent by weight of an aminotriazinealdehyde resin to from 15 percent to 85 percent of a heat reaction product of a polyalkylene glycol having a molecular weight of at least 200 and an alkyd esterification product of a polycarboxylic acid, a polyhydric alcohol containing at least three hydroxy groups and fatty acids of a drying oil, said heat reaction product containing from 10 to 30 percent by weight of said polyalkylene glycol based on the weight of said alkyd esterification product, adjusting the pH of the resulting mixture to about 8.0 to 10.0, and adding to said mixture from 5 percent to 75 percent by weight, based on the polymeric solids content, of a synthetic polymeric latex selected from the group consisting of polystyrene latex, polyvinyl chloride latex, polyvinylidene chloride latex, polyvinylacetate latex and a butadiene-styrene copolymer latex.

4. The method of preparing a water dispersed coating composition which comprises dissolving a water-soluble melamine-formaldehyde resin in water, adding the resulting aqueous solution to a heat reaction product of a polyethylene glycol having a molecular weight of at least 200 and an alkyd esterification product of a polycarboxylic acid, a polyhydric alcohol containing at least three hydroxy groups and fatty acids of a drying oil, said heat reaction product containing from 10 to 30 percent by weight of said polyethylene glycol based on the weight of said alkyd esterification product, adjusting the pH of the resulting mixture to about 8.0 to 10.0 by adding morpholine to said mixture, and adding to said mixture a polystyrene latex and a bactericide, said heat reaction product of said polyethylene glycol and said alkyd esterification product being present in an amount of 5 percent to 85 percent by weight, said melamine-formaldehyde resin being present in an amount of 5 percent to 50 percent by weight based upon the total non-volatile weight of the resinous components of the coating composition, and the polystyrene latex being present in an amount of 5 percent to 75 percent by weight based on the polymeric solids content thereof.

5. The coating composition of claim 1 wherein the synthetic polymeric latex is a polystyrene latex.

6. The coating composition of claim 2 having incorporated therein at least one pigment.

7. The coating composition of claim 6 wherein the pH is maintained within the said range of 8.0 to 10.0 by including morpholine in said composition.

8. The coating composition of claim 2 having a bactericide incorporated therein.

9. The coating composition of claim 8 wherein the bactericide is a member of the class consisting of the sodium salts o-phenylphenol and pentachlorophenol.

10. The method of claim 3 wherein the amino triazine-aldehyde resin is a melamine-formaldehyde resin.

11. The method of claim 10 wherein the polyalkylene glycol is a polyethylene glycol.

12. The method of claim 11 wherein the synthetic polymeric latex is selected from the class consisting of a polystyrene latex, a polyvinyl chloride latex, and a butadiene-styrene copolymer latex.

13. The method of claim 12 wherein the synthetic polymeric latex is a polystyrene latex.

14. The method of claim 4 wherein at least one pigment is incorporated in the coating composition.

References Cited in the file of this patent

UNITED STATES PATENTS

| | | |
|---|---|---|
| 2,166,542 | Bradley | July 18, 1939 |
| 2,400,054 | Robinson et al. | May 7, 1946 |
| 2,601,661 | Kienle et al. | June 24, 1952 |
| 2,663,696 | Armatys | Dec. 22, 1953 |
| 2,691,005 | Booth | Oct. 5, 1954 |
| 2,695,895 | Barnard et al. | Nov. 30, 1954 |

UNITED STATES PATENT OFFICE
CERTIFICATE OF CORRECTION

Patent No. 2,852,475 September 16, 1958

Roger M. Christenson et al.

It is hereby certified that error appears in the printed specification of the above numbered patent requiring correction and that the said Letters Patent should read as corrected below.

Column 5, line 65, for "Example III" read -- Example II --; line 68, for "Example II" read -- Example I --.

Signed and sealed this 26th day of May 1959.

(SEAL)
Attest:

KARL H. AXLINE
Attesting Officer

ROBERT C. WATSON
Commissioner of Patents